(12) United States Patent
Fujiwara et al.

(10) Patent No.: US 6,581,414 B2
(45) Date of Patent: Jun. 24, 2003

(54) OPTICAL NONLINEARITY MATERIAL AND PRODUCTION METHOD THEREFOR

(75) Inventors: Takumi Fujiwara, Nagoya (JP); Syuji Matsumoto, Nagoya (JP); Akira Ikushima, Nagoya (JP)

(73) Assignees: Toyota Jidosha Kabushiki Kaisha, Toyota (JP); Toyota School Foundation, Nagoya (JP)

( * ) Notice: Subject to any disclaimer, the term of this patent is extended or adjusted under 35 U.S.C. 154(b) by 0 days.

(21) Appl. No.: 09/929,341

(22) Filed: Aug. 15, 2001

(65) Prior Publication Data

US 2001/0054300 A1 Dec. 27, 2001

Related U.S. Application Data

(63) Continuation of application No. PCT/JP00/00874, filed on Feb. 16, 2000.

(30) Foreign Application Priority Data

Feb. 16, 1999 (JP) ............................................. 11-037905

(51) Int. Cl.[7] ........................ C03B 27/012; C03B 32/00; C03C 10/00
(52) U.S. Cl. ........................................ 65/33.2; 65/33.1
(58) Field of Search ................................. 65/33.1, 33.2

(56) References Cited

U.S. PATENT DOCUMENTS

| 6,246,815 | B1 | 6/2001 | Fujiwara et al. |
| 6,374,026 | B1 | 4/2002 | Fujiwara et al. |

FOREIGN PATENT DOCUMENTS

| JP | 5-119362 | 5/1993 |
| JP | 8-146475 | 6/1996 |
| JP | 8328061 | 12/1996 |
| JP | 9090447 | 4/1997 |
| JP | 9-166798 | 6/1997 |
| JP | 10-161164 | 6/1998 |
| WO | WO 96/16344 | 5/1996 |

OTHER PUBLICATIONS

Optical Fiber Communication '95 Technical Digest vol. 8 PostconferenceEdition, (Mar. 1995), T. Fujiwara et al., "UV–excited poling and electrically tunable bragg gratings in a germanosilicate fiber" pp. 347–350.
Appl. Phys. Lett., vol. 71, No.8 (Aug. 1997), M. Takahashi et al, "Defect formation in $GeO_2$—$SiO_2$ glass by poling with ArF excitation", pp. 993–995.
Appl. Phys. Lett., vol. 71, No. 8 (Aug. 1997), T. Fujiwara et al, "Second–harmonic generation in germanosilicate glass poled with ArF laser irradiation", pp. 1032–1034.
Appl. Phys. Lett., vol. 70, No. 2 (Jan. 1997), V. Pruneri et al, "Frequency doubling in galliumlanthanum–sulphid optical glass with microcrystals", pp. 155–157.
Proceedings of SPIE, vol. 3542 (Nov. 1998), Doped Fiber Devices II, t. Fujiwara et al, Second–order nonlinearity and structural change in UV–poled glass, pp. 94–101.
Appll. Phys. Lett., vol. 65, No. 13 (Sep. 1994), H. Hosono et al, "Novel approach for synthesizing Ge fine particles embedded in glass by ion implantation: Formation of Ge manocrystal in $SIO_2$—$GeO_2$ glasses by proton implantation", pp. 1632–1634.
Proceedings of Japan Ceramics Society; 11th. Autumn Symposium (Oct.1, 1998 published), A. Narazaki et al, "Non-linear optical characteristics of the surface–crystallized glass", p. 241.
Fujiwara et al., "Second–Order Nonlinearity and Structural Change in UV–Pooled Glass," Proceedings of SPIE, Doped Fiber Devices II, Nov. 1998, vol. 3542, pp. 94–101.

Primary Examiner—Michael Colaianni
(74) Attorney, Agent, or Firm—Pillsbury Winthrop LLP

(57) ABSTRACT

Voltage is applied between electrodes (14a, 14b) under UV irradiation to perform a UV excitation poling, thereby producing microcrystal particles at a core unit (10a). Accordingly, second-order optical nonlinearity is developed at the core unit (10a) of an optical fiber (10). Under a high-temperature condition, a second-order optical nonlinearity can be imparted by a comparatively low-voltage UV excitation poling when a second-order optical nonlinearity decreases.

4 Claims, 14 Drawing Sheets

US 6,581,414 B2

OPTICAL NONLINEARITY MATERIAL AND PRODUCTION METHOD THEREFOR

This application is a continuation of International Application PCT/JP00/00874, with an international filing date of Feb. 16, 2000, was not published in English under PCT Article 21(2).

TECHNICAL FIELD

The present invention relates to optical non-linear material made of glass, and in particular to optical non-linear material containing micro crystal particles and a method for manufacturing the same.

BACKGROUND ART

Conventionally, information transmission using light, such as with the use of optical fibers, has found increasingly wider use for large-volume information transmission. Such information transmission systems require various optical functional elements. To manufacture such optical functional elements, materials having second-order optical non-linearity are important. As materials having second-order optical non-linearity, crystalline materials such as $LiNbO_3$ are widely utilized. Meanwhile, it is desirable to use glass material in terms of a stable connection with an optical fiber, low loss of the transmitted light, low cost, and a wide rage of transmitting wavelength.

For example, Japanese Patent Laid-open Application No. Hei 10-111526 proposes that UV-excited poling is applied to Ge-doped $SiO_2$-based glass to impart thereto a second-order optical non-linearity in which a d-constant, or an optical non-linearity constant, is 2.5 pm/V or larger.

As such, it has conventionally been proposed that UV-excited poling is applied to glass materials to impart remarkably large second-order optical non-linearity thereto. However, there has still been a desire to manufacture glass materials having larger second-order optical non-linearity more easily.

The present invention has been conceived in view of the above, and aims to provide a material having improved optical non-linearity and a manufacturing method therefor.

DISCLOSURE OF INVENTION

Non-linear material according to the present invention is characterized by the fact that micro-crystal particles, obtained by partially crystallizing a glass phase, are dispersed in the glass phase. Presence of micro-crystal particles enables development of large second-order optical non-linearity.

Preferably, the micro-crystal particles each have a diameter of 10 to 20 µm.

Preferably, glass materials are subjected to UV-excited poling, in which UV strength is 10 $mJ/cm^2$ or more and an electric field strength is $3×10^4$ V/cm or more, so that a non-linear optical constant, or a d-constant, becomes 1 pm/v or more.

A method for manufacturing an optical non-linear material according to the present invention is characterized by the fact that glass material is subjected to partial crystallization. Generation of micro-crystal particles as above enables development of large second-order optical non-linearity in the glass material.

Preferably, glass materials are subjected to UV-excited poling, in which UV strength is 10 $mJ/cm^2$ or more and an electric field strength is $3×10^4$V/cm or more, so that a non-linearity optical constant, a d-constant, becomes 1 pm/V or more.

A method for manufacturing non-linear material according to the present invention is characterized by the fact that glass material is subjected to partial crystallization to disperse micro-crystal particles, or partially crystallized glass phase, and then to UV optical poling. That is, when glass material is subjected to partial crystallization in advance, second-order optical non-linearity can be developed in the glass material through UV-excited poling using a relatively low electric field.

Preferably, the partial crystallization is UV-excited poling in which UV strength is 10 $mJ/cm^2$ or more and an electric field strength is $3×10^4$V/cm or more, and UV-excited poling at a subsequent step is applied using a lower voltage than that which is used in the UV-excited poling for partial crystallization.

BEST MODE FOR CARRYING OUT THE INVENTION

In the following, preferred embodiments of the present invention will be described based on the accompanying drawings.

Figure 1:
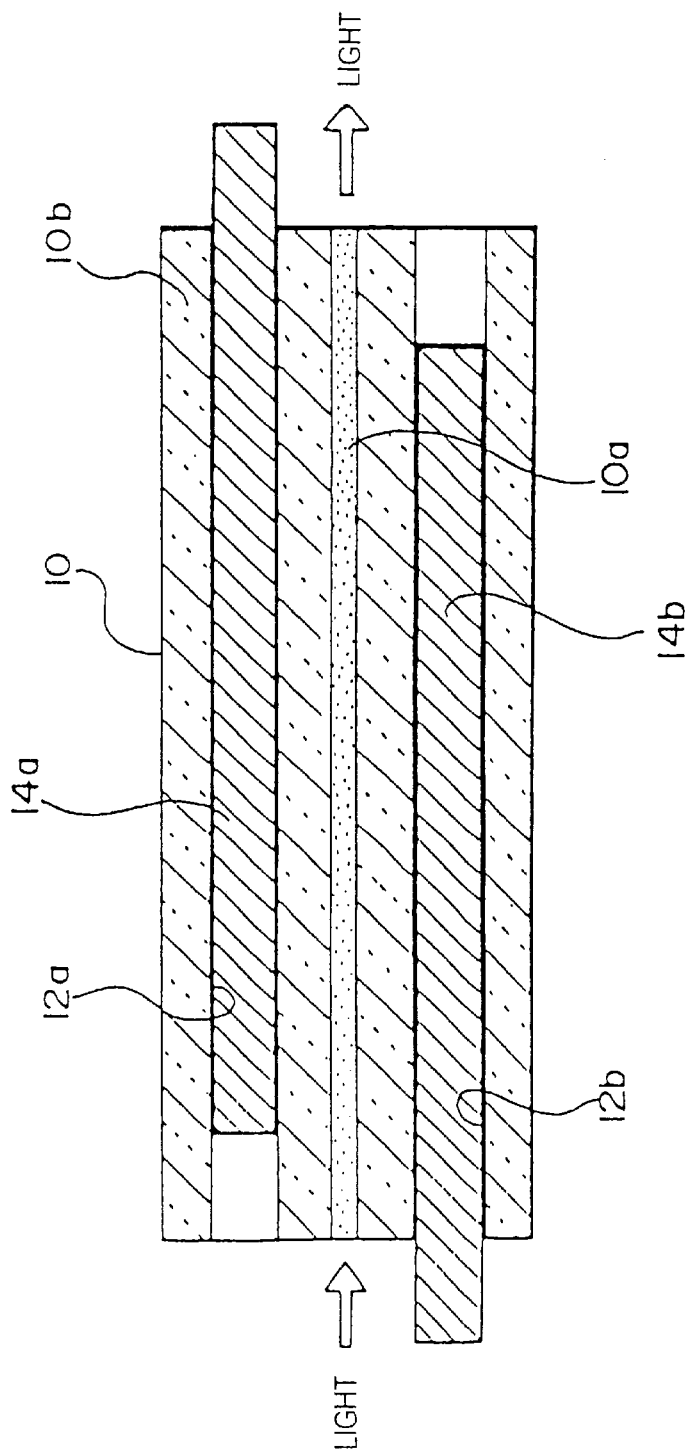
FIG. 1 is a front cross sectional view showing a structure of a preferred development.
Figure 2:
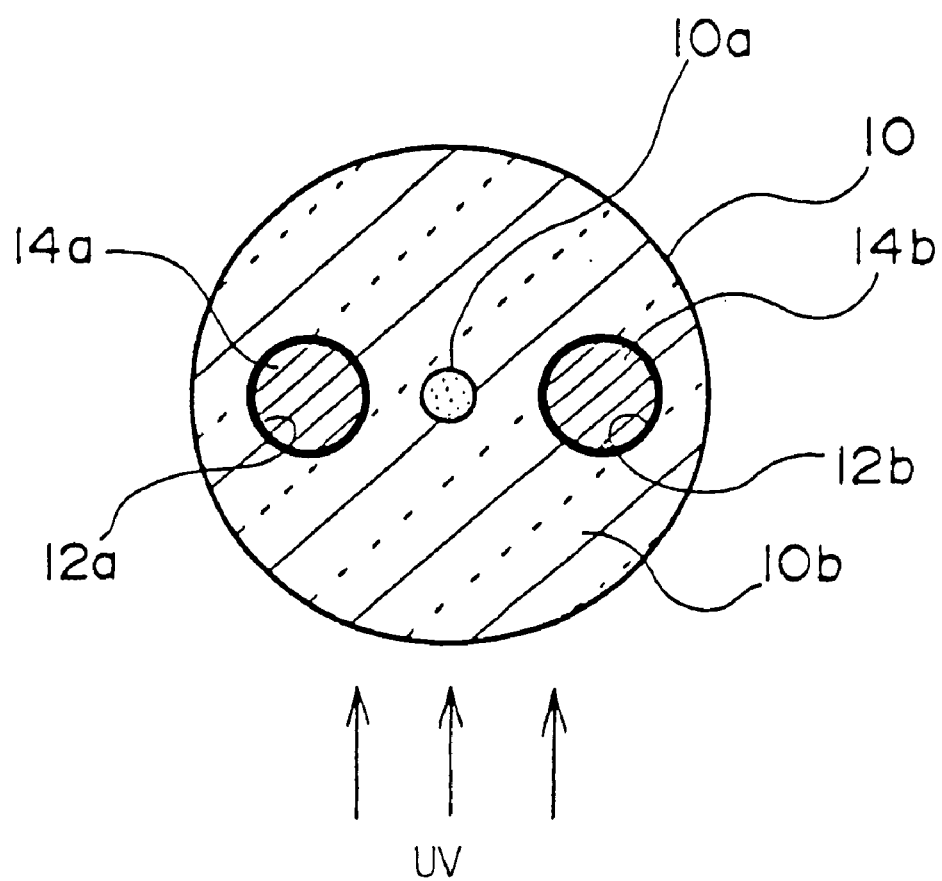
FIG. 2 is a lateral cross sectional view showing a structure of a preferred development.

FIGS. 1 and 2 are schematic diagrams showing a structure of an optical functional element using $SiO_2$-based glass materials according to the present invention. An optical fiber 10 formed of cylindrically drawn silica glass ($SiO_2$) and doped with, for example, germanium (Ge) has a light conducting core section 10a at its middle portion with an adjusted refractive index and a clad section 10b in the outer portion.

A pair of side holes 12a, 12b are formed in the clad section 10b and aluminum wire electrodes 14a, 14b are inserted therein such that they oppose each other with the core section 12a interposed between them, as shown in the drawings.

Here, Ge is doped to the core section 102, where second-order optical non-linearity having a magnitude (or a d-constant) of 1 pm/V or larger is caused.

In particular, the core section 10a contains micro-crystal particles, or partially crystallized glass phase, dispersing in a glass phase. The dispersed micro-crystal particles each have a diameter of 10 to 20 µm. With such micro-crystal particles dispersing in a glass phase, sufficiently large second-order optical non-linearity can be obtained.

Such particles are manufactured as follows. First, an optical fiber having electrodes 14a and 14b inserted into the side holes 12a and 12b, respectively, is prepared. Then, the center portion of the optical fiber 10 is doped with Ge in the range from more than 12 mol % to less than 30 mol %. Note that, to manufacture the optical fiber 10, for example, preforms are sequentially laminated while doping with different amounts of Ge to thereby form a portion corresponding to a core section, which is then subjected to fiber-drawing while heating.

The optical fiber 10 has a diameter of 200 µm. The side holes 12a, 12b each have a diameter of approximately 40 µm. The electrodes 14a, 14b each have a diameter of approximately 40 µm and a length of approximately 4 cm. The electrodes 14a, 14b are located with an interval of 8–10 µm between each other. The optical fiber 10 has a length of about 10 cm.

Here, as shown in FIG. 1, the electrodes 14a, 14b are inserted into the side holes 12a, 12b, respectively, from different sides of the optical fiber, so that the respective ends of the electrodes 14a, 14b project in different directions. This arrangement is employed in order to prevent electric discharge between the electrodes 14a, 14b. The air breakdown voltage is about $10^4$V/cm. In order to apply an electric field greater than this voltage to the core section 10a, a longest possible path where air is present must be ensured. The structure of the electrodes 14a, 14b shown in FIG. 1 enables application of a high electric field to the core section 10a.

A voltage is applied between the electrodes 14a, 14b to thereby apply an electric field of approximately $1 \times 10^5$V/cm or over to the core section 10a. Under such circumstances, a pulsed ArF excimer laser (193 nm wavelength) is applied to the core section 10a to thereby irradiate the core section 10a with UV. The energy density of the laser is approximately 20–100 mJ/cm². Preferably, laser pulses are emitted approximately $10^4$ times.

With the above UV-excited poling, micro-crystal particles are generated within a glass phase at the core section 10a.

Figure 3A:
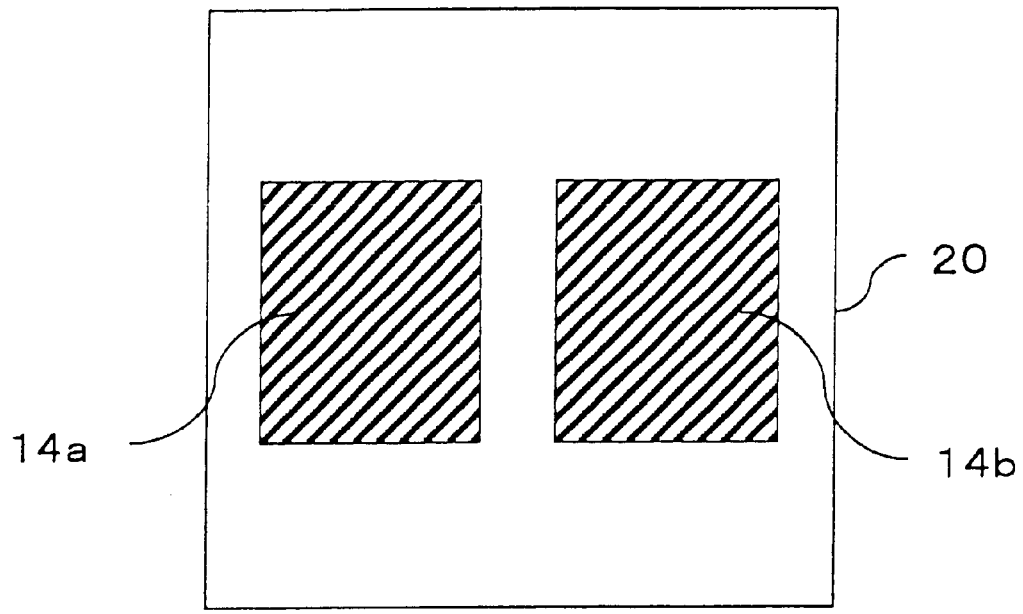
FIGS. 3A and 3B show a structure of a plane waveguide.
Figure 3B:
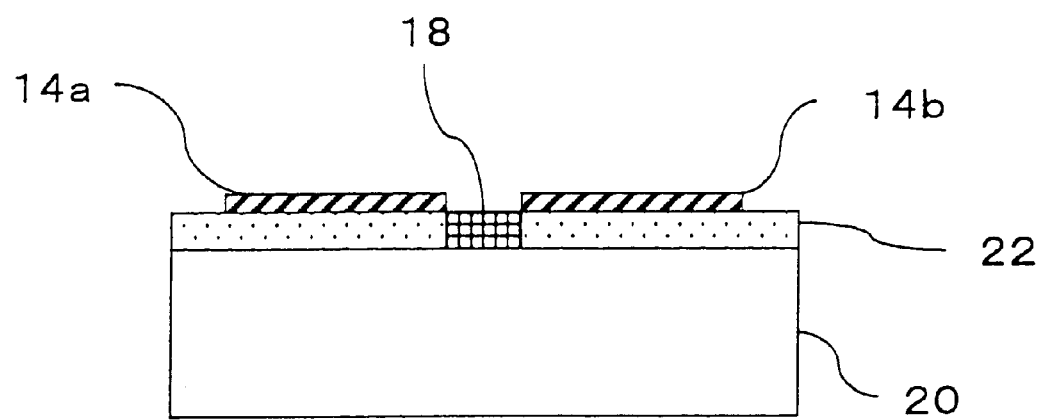

FIGS. 3A and 3B show a structure of plane wave-guide according to the present invention. In the plane wave-guide, Ge-containing $SiO_2$ thin film 22 is formed on the surface of a plane-like glass substrate 20. The $SiO_2$ thin film 22 has a thickness of 1 to 5 µm and Ge density of 1 to 30 mol %. On the $SiO^2$ thin film 22 lie the electrodes 14a, 14b opposing each other with a predetermined interval between them.

Within a portion of the $SiO_2$ thin film 22, corresponding to the space between the electrodes 14a, 14b, micro-crystal particles are generated through UV-excited poling, causing the portion to serve as a channel section 18 having optical non-linearity.

The optical proprieties of the channel section 18 can be controlled through voltage applied to the space between the electrodes 14a, 14b. This causes the plane wave-guide to serve as an optical functional element.

Figure 4:
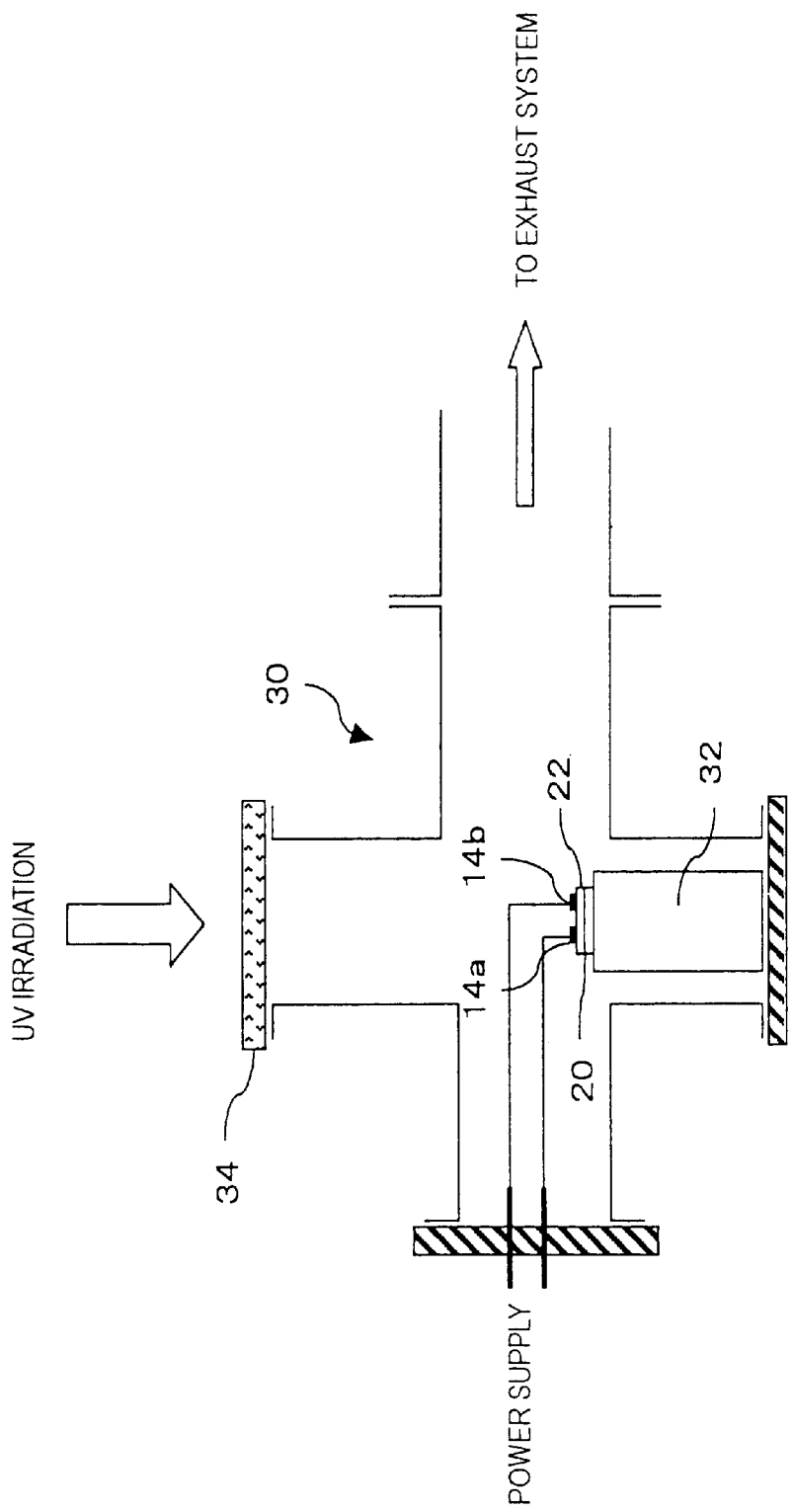
FIG. 4 is a diagram showing UV-excited poling utilizing a vacuum chamber.

The UV poling for generation of micro-crystal particles in the channel section of a plane wave-guide is desirably applied in a vacuum. FIG. 4 shows a structure for such an arrangement. A vacuum chamber 30 comprises intercrossing pipes having three closed ends and one open end, the one open end connected to an exhaustion system, such as a vacuum pump. Within the pipe extending vertically downward, a sample mounting unit 32 is situated, on which a glass substrate 20 having electrodes 14a, 14b and a $SiO^2$ thin film formed thereon is situated. The electrodes 14a, 14b are connected to a power supply outside the vacuum chamber. The pipe extending vertically upward is sealed by a quartz glass 43, via which UV enters the pipe.

While irradiating the $SiO^2$ thin film 22 with UV using this device, a high voltage is applied to between the electrodes 14a, 14b. In vacuum, where no breakdown occurs, differing from a case in air, a desired high voltage can be applied between the electrodes 14a, 14b for UV poling to generate micro-crystal particles dispersing in the $SiO^2$ thin film 22 (channel section 18). With such micro-crystal particles generated, second-order optical non-linearity can be imparted to the glass materials.

Preferably, the channel section 18, together with the electrodes 14a, 14b, may be covered by a $SiO_2$ film to enhance the degree of insulation between the electrodes 14a, 14b.

Figure 5:
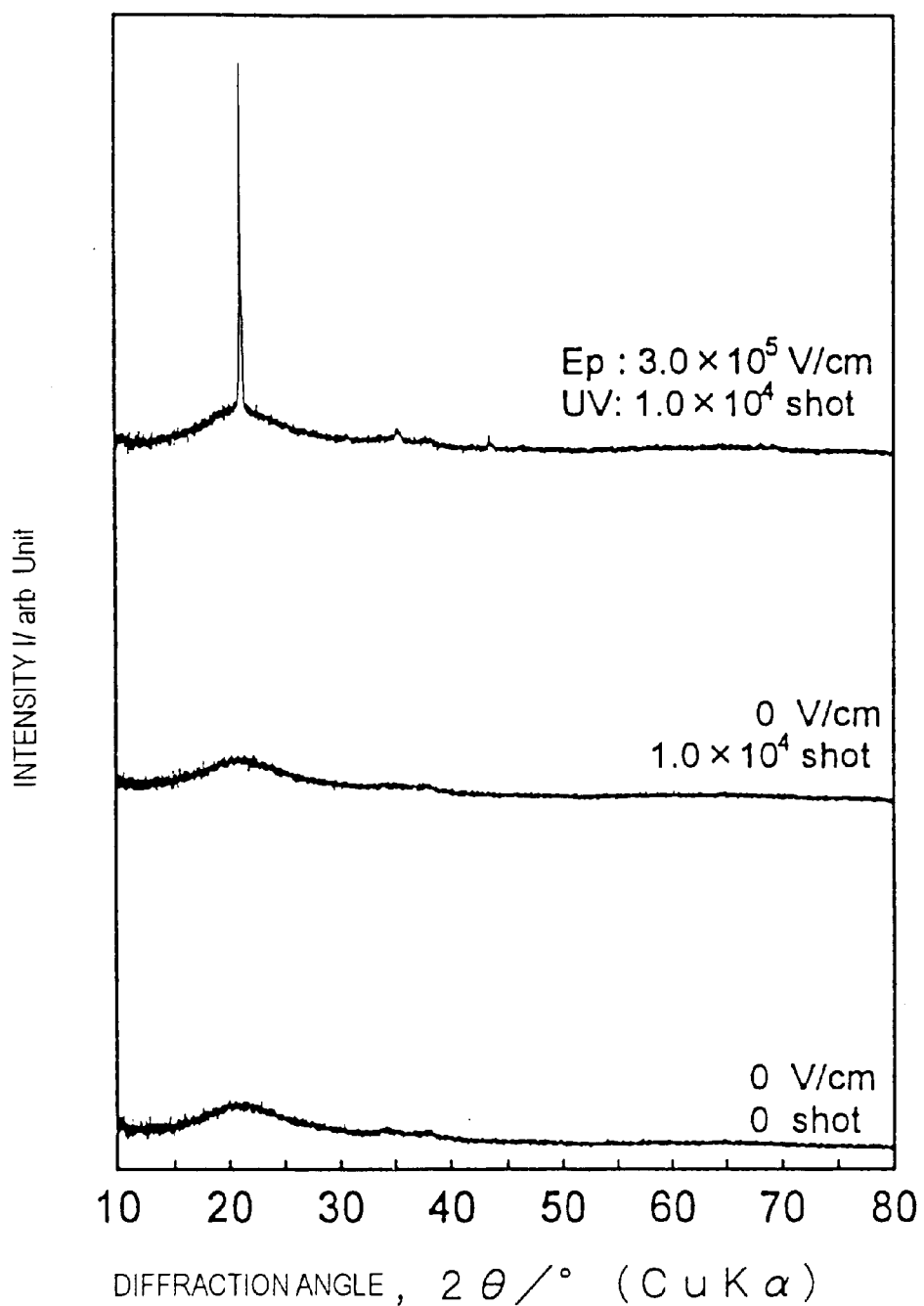
FIG. 5 is a diagram showing results of an X-ray diffraction test.

FIG. 5 is a graph showing a result of X-ray diffraction with respect to glass materials thus created (Ge-doped $SiO_2$ glass material), in which the abscissa corresponds to a diffraction angle 2θ/°, and the ordinate corresponds to intensity (unit I/arb. units). The line source is CuKα. It is learnt from the drawing that, with the glass materials subjected to UV-excited poling with the electric field intensity (Ep) $3.0 \times 10^5$V/cm and UV irradiation $1.0 \times 10^4$ shots, a peak is formed due to crystal, and that microcrystal particles are generated in the glass materials. It is also learnt that no crystal particle is generated by UV irradiation only (0V/cm, $1.0 \times 10^4$ shots). Note that, in the drawing, glass material before being subjected to UV-poling is shown as 0 V/cm, 0 shot (no laser shot).

Figure 6:
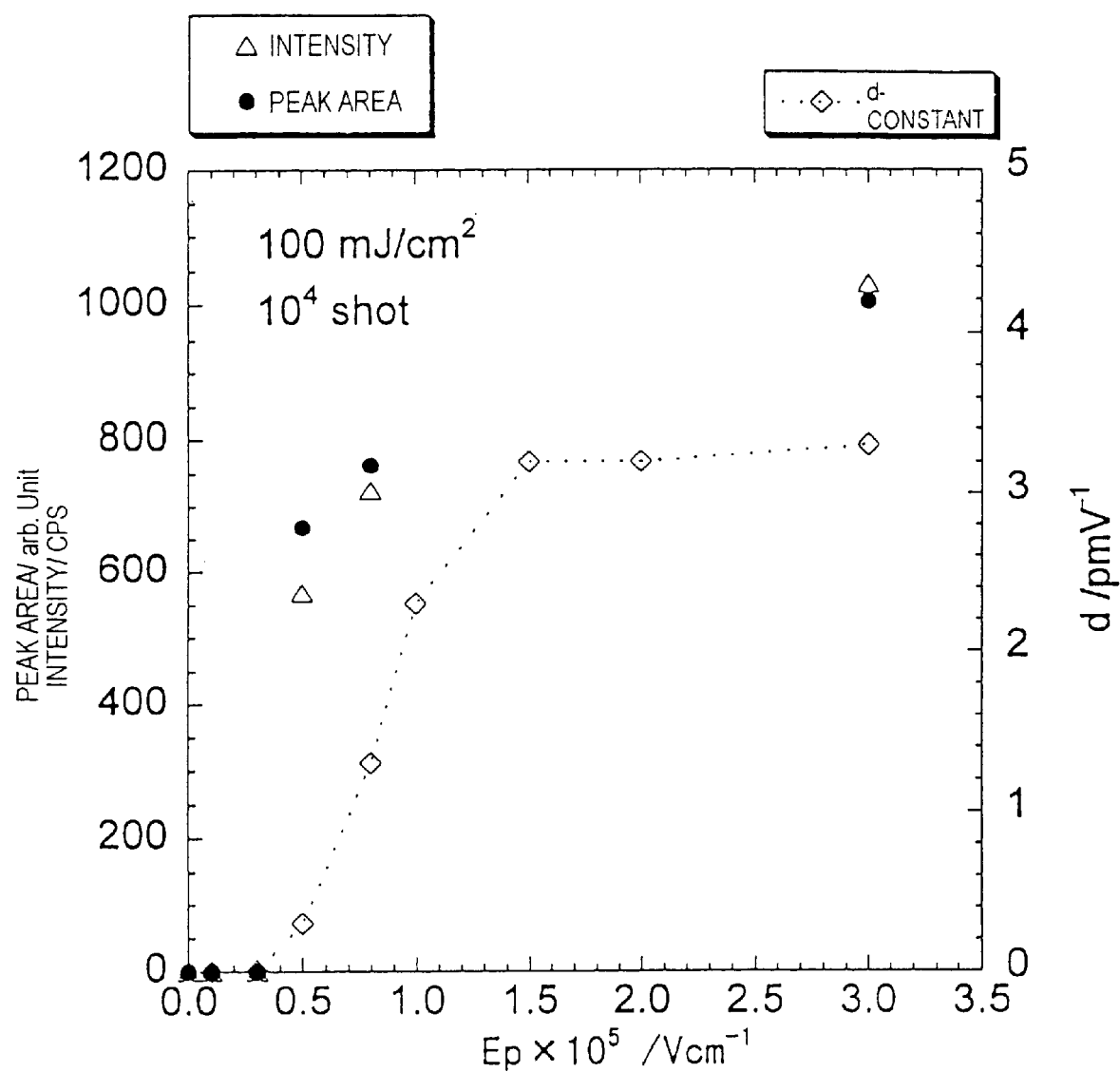
FIG. 6 is a diagram showing correlation between the X-ray diffraction text and a d-constant.

FIG. 6 is a graph showing a relationship between the intensity of applied electric field in UV-excited poling and a peak intensity (CPS) and a peak area (arb. units) of X-rays for crystallization and a d-constant (pm/V), in which Δ stands for intensity, ● stands for an area, and ◇ stands for a d-constant. As shown, it is appreciated that an extent of crystallization and a d-constant retain a good mutual correlation. Note that UV energy and the number of pulses in UV-excited poling are of 100 mJ/cm² and $10^4$, respectively.

In the case where a glass material that has once developed optical non-linearity due to UV-excited poling is held under high temperature such as about 500° C., the optical non-linearity once developed gradually decreases. However, it is learnt through X-ray diffraction that the micro-crystals generated in such glass material do not disappear. That is, the micro-crystal particles in the glass phase remain in the current state, while optical non-linearity once developed decreases.

Figure 7:
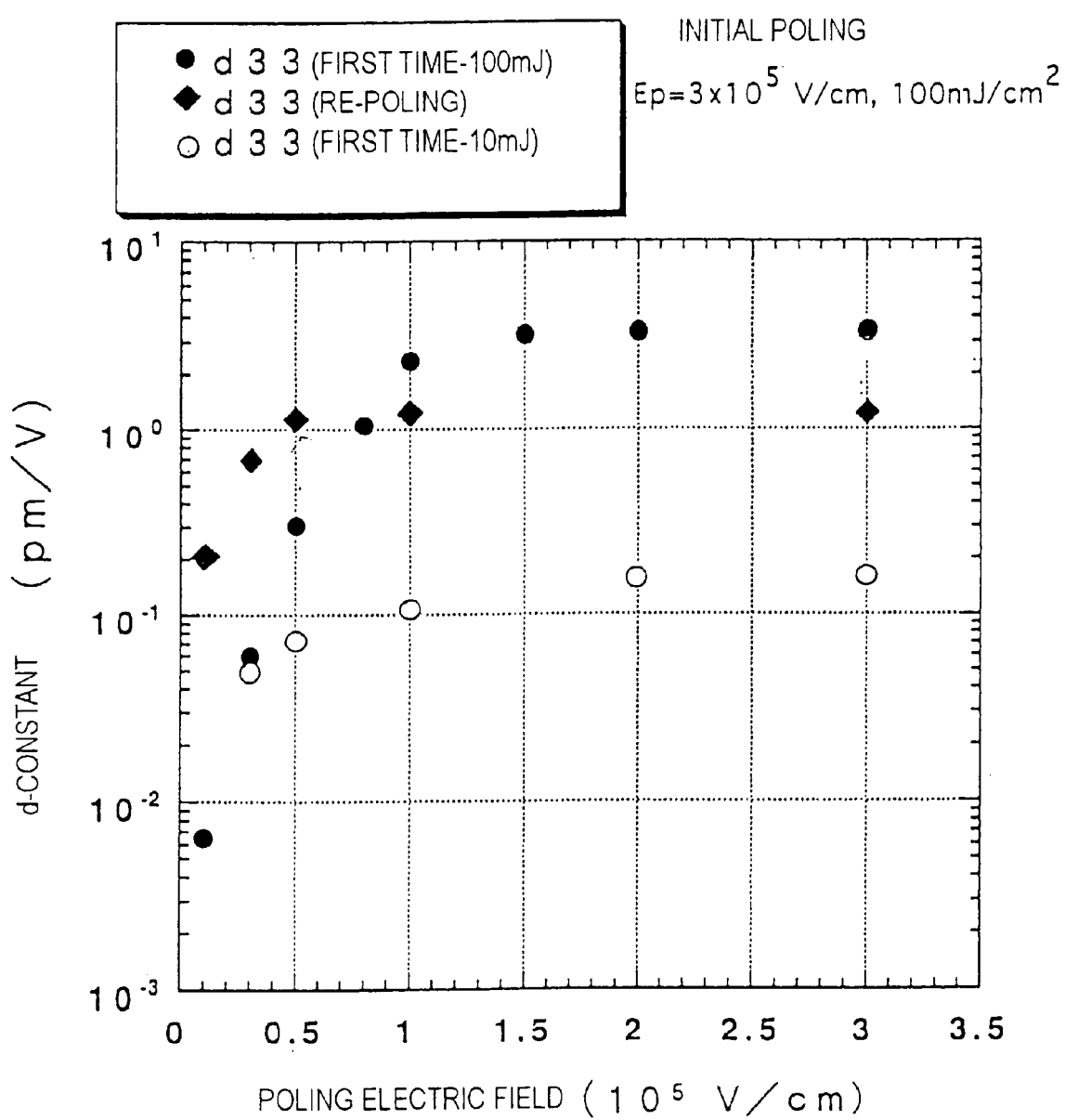
FIG. 7 is a diagram showing a d-constant resulting from UV-excited poling applied more than two times.

Then, when UV-excited poling is applied again to such glass material, second-order optical non-linearity can be developed again in response to an electric field of relatively small intensity. That is, in the case where UV-excited poling at $3 \times 10^5$ V/cm and 100 mJ/cm² is applied to glass material, as shown by ♦ in FIG. 7, and the second-order optical non-linearity developed in the glass material is made to disappear, it is possible to again develop optical non-linearity in which d-constant is 1 pm/V or over by applying an electric field of about $0.5 \times 10^5$ V/cm. In the drawing, ● stands for the result of a first UV-excited poling. It is learnt that a d-constant does not increase in response to an electric field applied though irradiation of UV of 10 mJ/cm², as represented by ○ in the drawing.

Here, the intensity $0.5 \times 10^5$ V/cm of an electric field, which is necessary in the second UV-excited poling, is substantially equal to that which causes air breakdown. Therefore, it is possible to apply UV-excited poling for development of second-order optical non-linearity without causing breakdown when only a simple insulation process is applied, such as placement of an insulating member between electrodes.

Here, in the case where an optical functional element is made of glass material of the present invention and used under high temperature, second-order optical non-linearity can be restored through periodic application of UV-excited poling. Moreover, because the intensity of an electric field necessary in that poling is significantly low, the UV-excited poling can be applied in air, i.e., without the need for a vacuum environment.

Further, for a plane wave guide, preferably, a first UV-excited poling is applied in vacuum to generate micro-crystal particles in a thin film, as described above. In this case, the element may be subjected to high temperature due to subsequent annealing and the second-order optical non-linearity may thus decrease. However, even so, the optical non-linearity is restorable through application of UV-excited poling. In particular, as the electric field used in the UV-excited poling applied to restore second-order optical non-linearity is small, as described above, there is only a slight possibility that the poling could adversely affect other structures.

Figure 8:
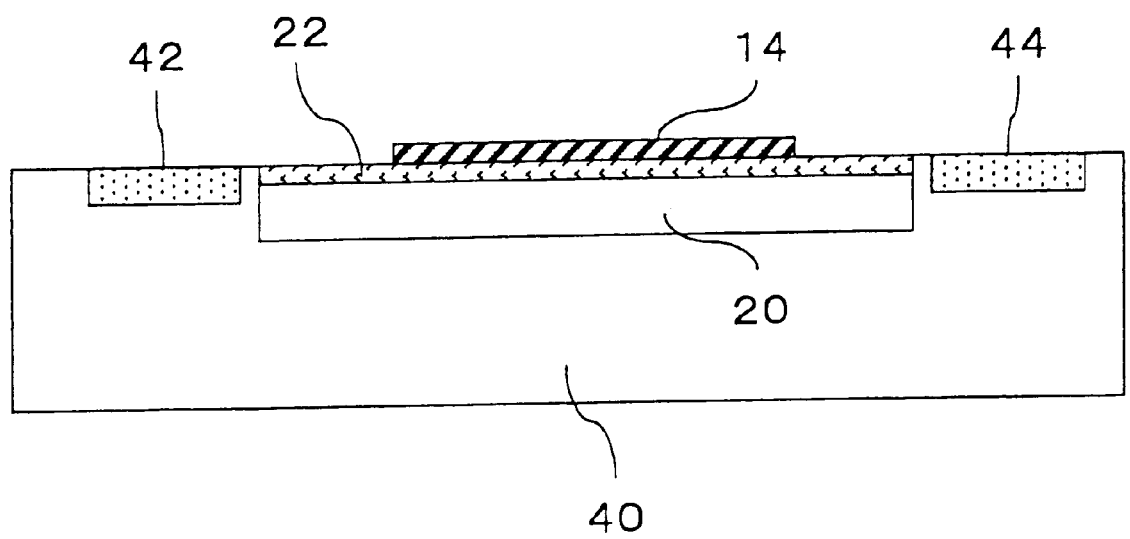
FIG. 8 is a diagram showing a structure of a hybrid circuit.

A glass substrate is formed in a part of a semiconductor substrate and an optical functional element is formed thereon whereby a preferable hybrid circuit substrate is formed. Specifically, this hybrid circuit substrate comprises, as shown in FIG. 8, a Si substrate 40 and a glass substrate 20 formed in a part of the Si substrate 40, and a Ge-doped $SiO_2$ thin film 22 formed on the glass substrate 20. Then, UV-excited poling is applied to the channel section 18 of the $SiO_2$ thin film 22 to thereby impart optical non-linearity to complete the element.

Meanwhile, a photo changing element, such as a light emission element 40 and light receiving element 42, is formed in the peripheral portion of the Si substrate so that light can be transmitted and received through the light emission element. That light is controlled using an optical functional element. In this case also, in the case where first UV-excited poling is applied at a stage where no adverse effect is caused to other structures and the optical non-linearity at the channel section 18 decrease in subsequent processing, second UV-excited poling can be applied with a relatively low voltage Note that, when glass material with a second-order optical non-linearity developed is placed under high temperature, the d-constant relaxes according to a simple exponential function type. This fact can also evidence the presence of micro-crystal particles in the glass material. Moreover, observation using a TEM electron microscope ensures the presence of micro-crystal particles.

Here, application of UV-excited poling enables generation of micro-crystal in glass material and imparting of second-order optical non-linearity thereto. This is believed to be the result of cooperative actions between an electric field and UV excitement. Meanwhile, supposing that UV is polarized light having constant wave surfaces, it is believed that UV irradiation may cause an electric field in a constant direction as the light is an electromagnetic wave.

With irradiation of such polarized UV, second-order optical non-linearity can be imparted to a glass material without application of an electric field. Note that harmonics from a solid laser may be usable as such polarized UV. Alternatively, such polarized UV can be obtained though doubling.

It should be noted that application of an electric field is not indispensable for generation of micro-crystal particles in glass phase. That is, heating glass material under UV irradiation can also generate micro-crystal particles. In this case, however, although micro-crystal particles can be generated, sufficient second-order optical non-linearity cannot be imparted due to the lack of sufficient electric field. Then, UV-poling is applied to glass material containing micro-crystal particles dispersed therein to impart second-order optical non-linearity thereto. This arrangement allows use of a smaller electric field, so that UV-poling can be applied without considering air breakdown and effects on other elements.

Figure 9:
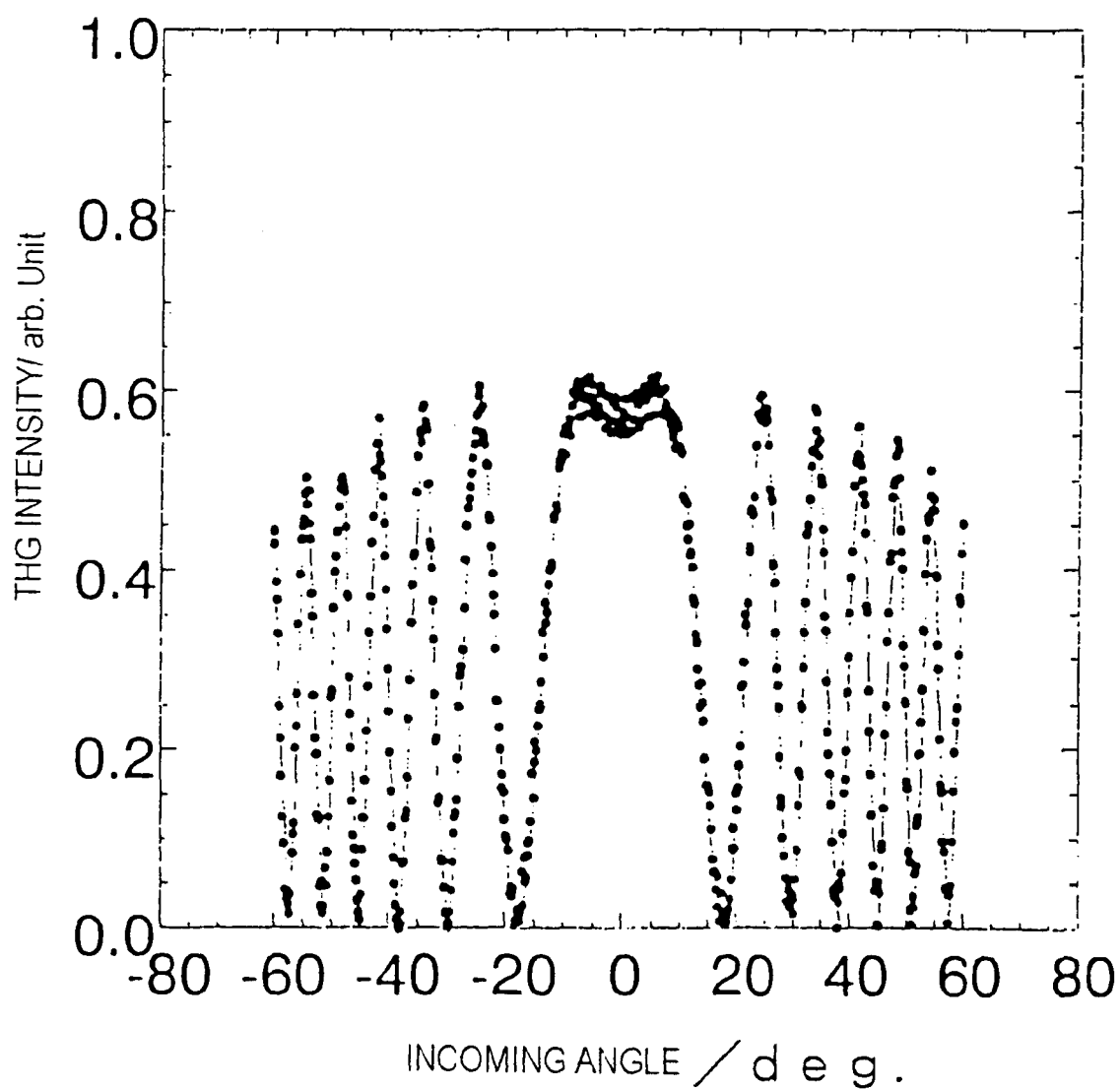
FIG. 9 is a diagram explaining an example of third-order harmonic generation (THG) (before UV poling)
Figure 10:
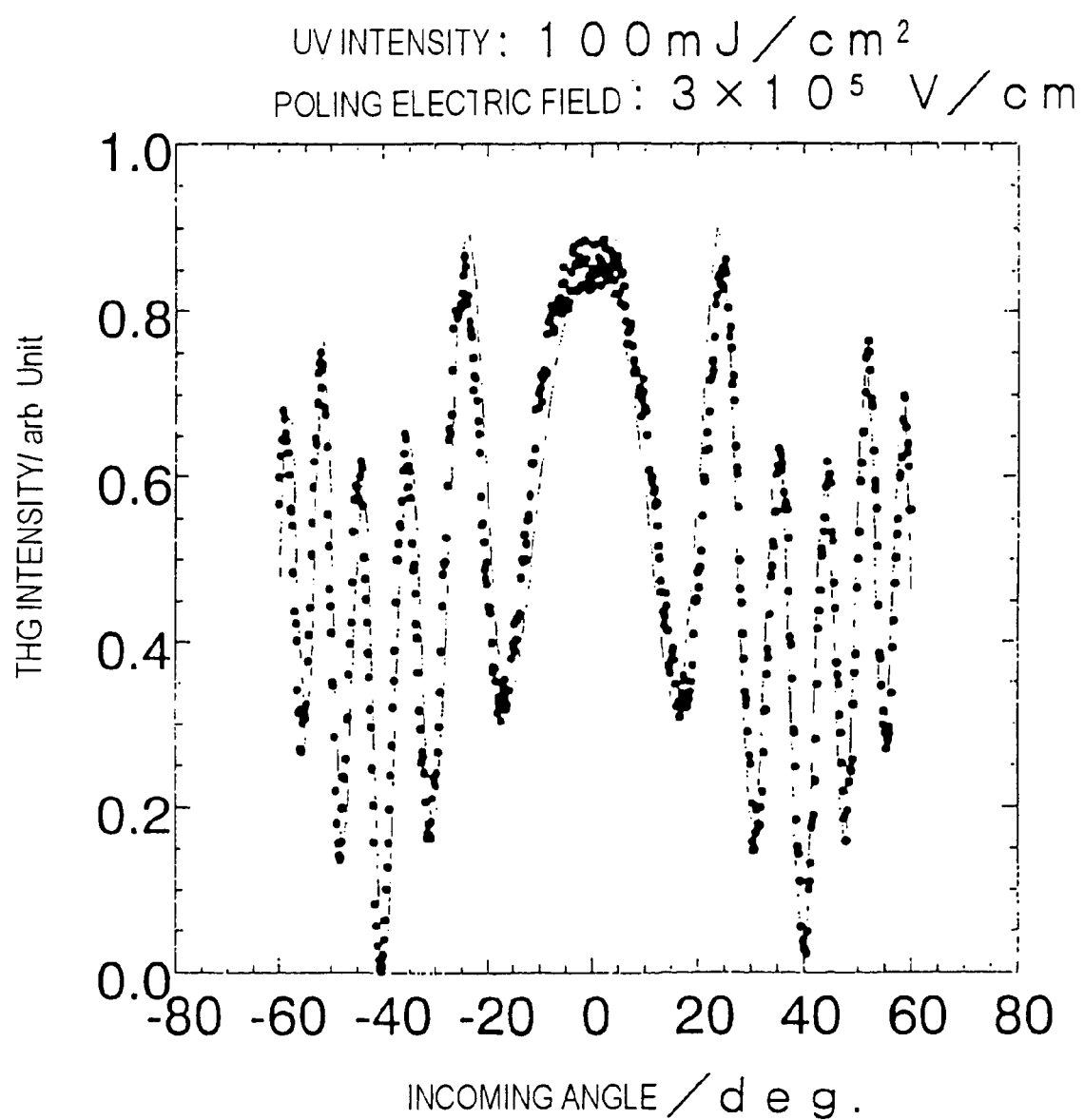
FIG. 10 is a diagram explaining an example of third-order harmonic generation (THG) (after UV poling)

Further, once micro-crystal particles are generated in glass material, the non-linearity $X^{(3)}$ of the glass material will increase due to the crystals. FIGS. 9 and 10 are diagrams explaining an example of generation of a third-order harmonics (THG), using a maker filling method, with respect to glass material subjected to UV-poling. FIG. 9 shows a THG pattern before application of UV-poling. FIG. 10 shows a THG pattern after application of UV-poling. It is learnt from the drawings that the shape of a THG pattern changes significantly due to UV poling, and that, after UV-poling, an area having a $X^{(3)}$ different from that before the processing is generated.

Figure 11:
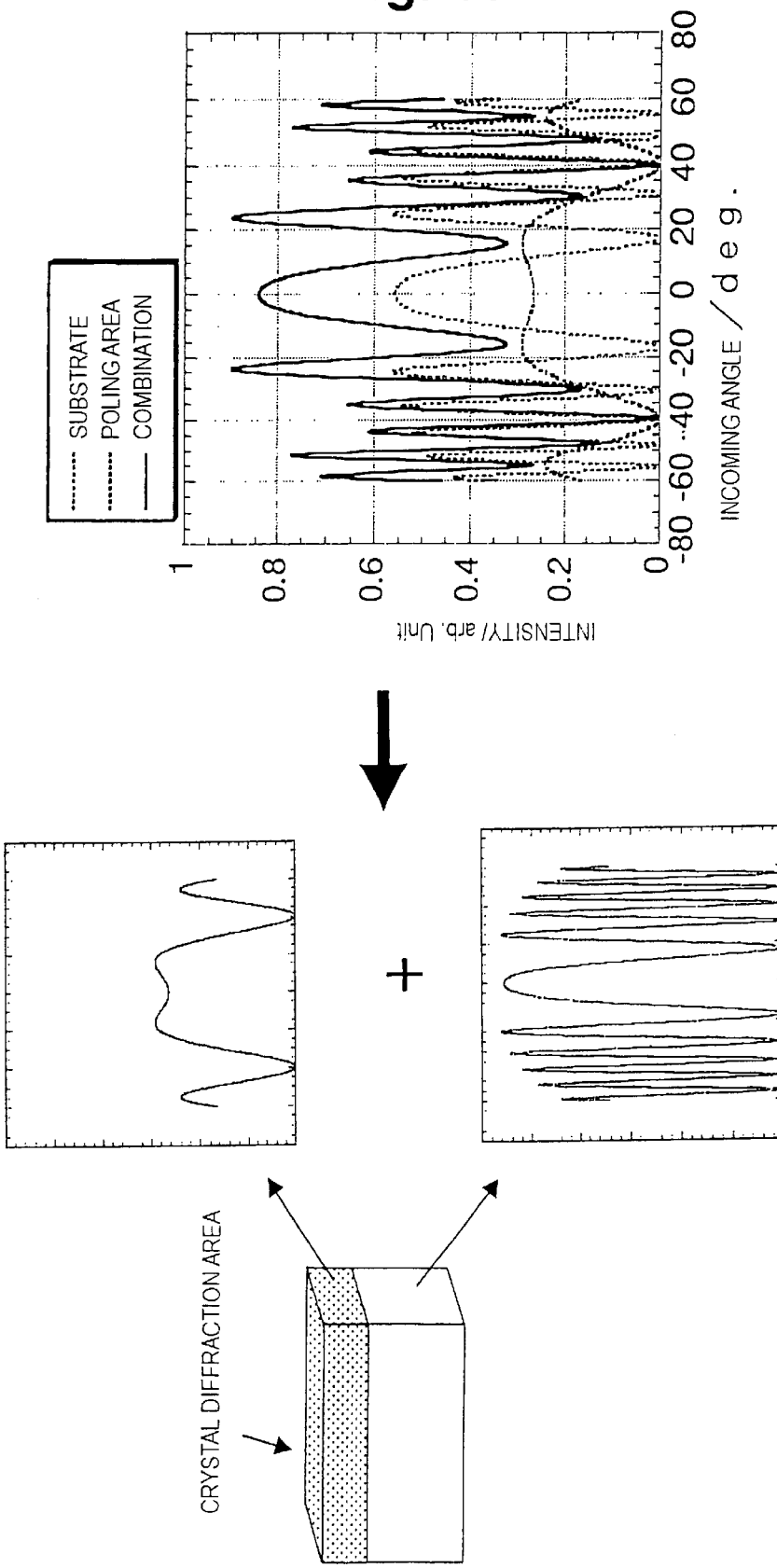
FIG. 11 is a diagram describing the principle relied on in analysis of a THG pattern.

FIG. 11 is a diagram showing the principle relied on in analysis of the THG pattern. Initially, the substrate is irradiated with UV on its surface side whereby the surface of the substrate is crystallized. Therefore, it is assumed that the crystallized area on the surface may have a $X^{(3)}$ having a different value from that before the processing.

In view of the above, it is assumed that the THG pattern shown in FIG. 10 be a combination of a THG pattern relative to the substrate and that relative to the crystallized surface area. Therefore, subtraction of the THG pattern of FIG. 9 from that of FIG. 10 enables estimation of a THG pattern for the crystallized area. The result is shown as a pattern in the upper middle part of FIG. 11, and the value of $X^{(3)}$ relative to the crystallized area can be measured from the resultant pattern.

Figure 12:
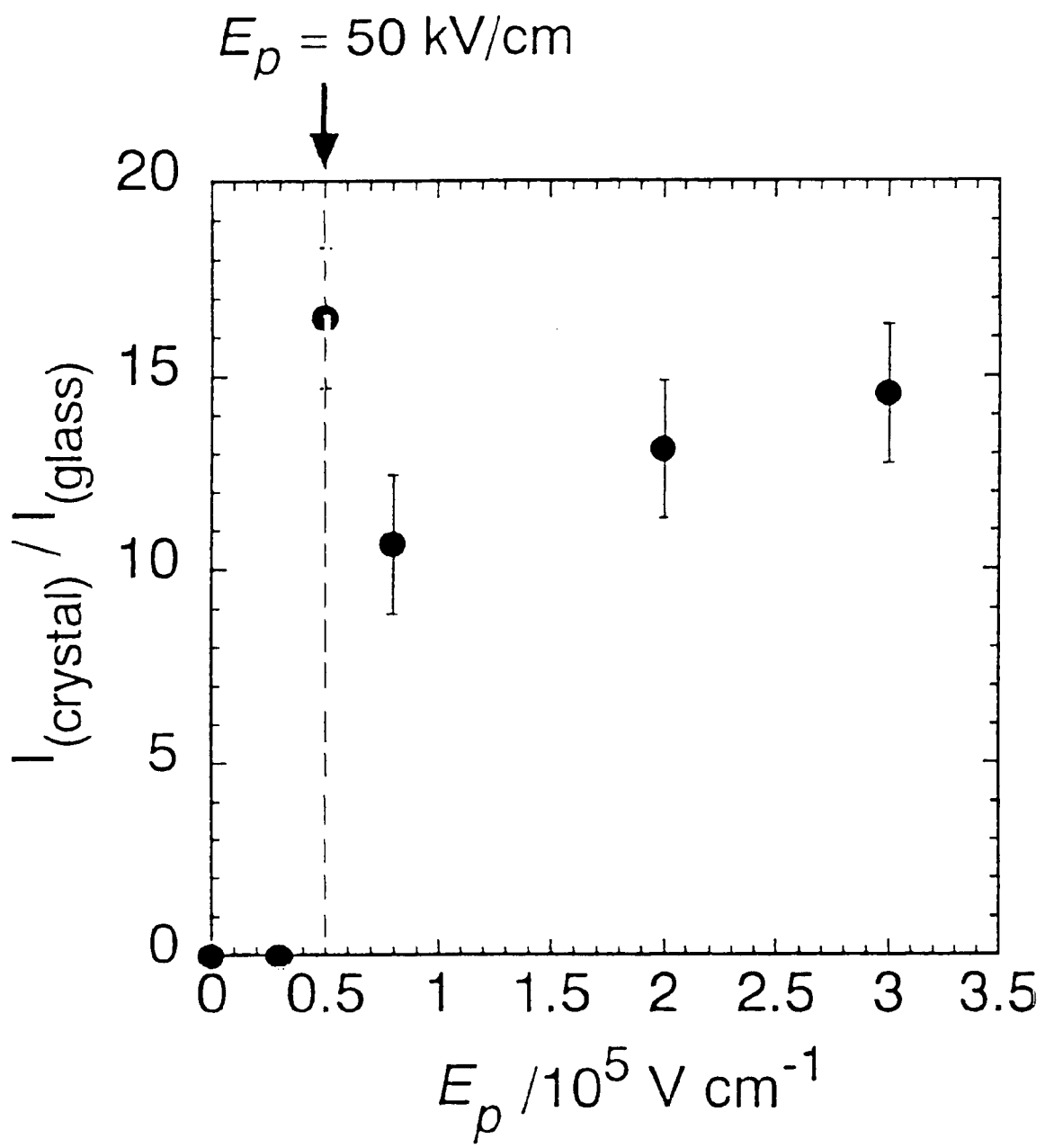
FIG. 12 is a diagram showing dependency of the value $X^{(3)}$ on a poling electric field.

FIG. 12 shows dependency of the value $X^{(3)}$ on a poling field, in which the ordinate corresponds to a change, expressed in the form of a ratio, of $X^{(3)}$ between before and after poling. As shown, $X^{(3)}$ increases significantly for a poling field equal to about $0.5 \times 10^5$ V/cm or larger, becoming about fifteen times of $X^{(3)}$ for a poling field smaller than about $0.5 \times 10^5$ V/cm. For a poling field about $0.5 \times 10^5$ V/cm or larger, $X^{(3)}$ once decreases to about ten times and again increases gradually. This increase, however, is not such a large one as that which occurs before and after the value of poling field $0.5 \times 10^5$ V/cm.

Figure 13:
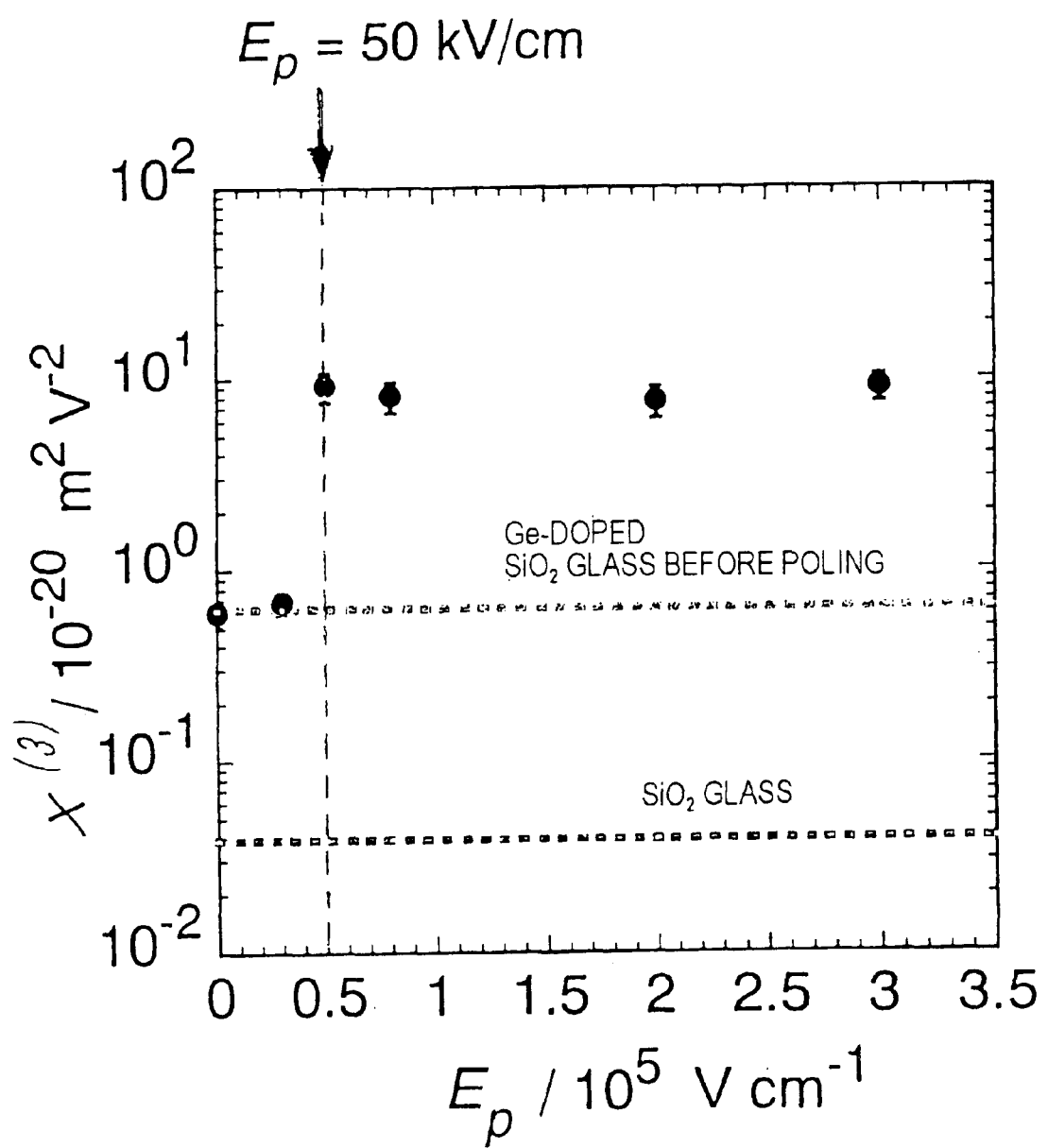
FIG. 13 is a diagram showing dependency of the value $X^{(3)}$ on a poling electric field.

FIG. 13 additionally shows the value of $X^{(3)}$ with $SiO_2$ glass material without Ge doping. As shown, after UV-poling, the value $X^{(3)}$ for Ge-doped $SiO_2$ glass material increases to about 200 times as large as that for $SiO_2$ glass material without Ge doping.

Accordingly, it is obvious from the above experiment results that crystallization through UV-poling causes third-order optical non-linearity to increase.

The following two reasons may account for the increase of third-order optical non-linearity.

(1) The crystals caused, which themselves are of an unknown material, may possess large third-order optical non-linearity; and (2) Crystal may have a more significant local electric field effect, or concentration of incident optical waves in a high refractive index area (i.e., crystal) as crystal is expected to have a higher concentration than that of glass, and refractive index of crystal is thus higher than that of glass.

A combination of these two reasons is also possible.

Figure 14:
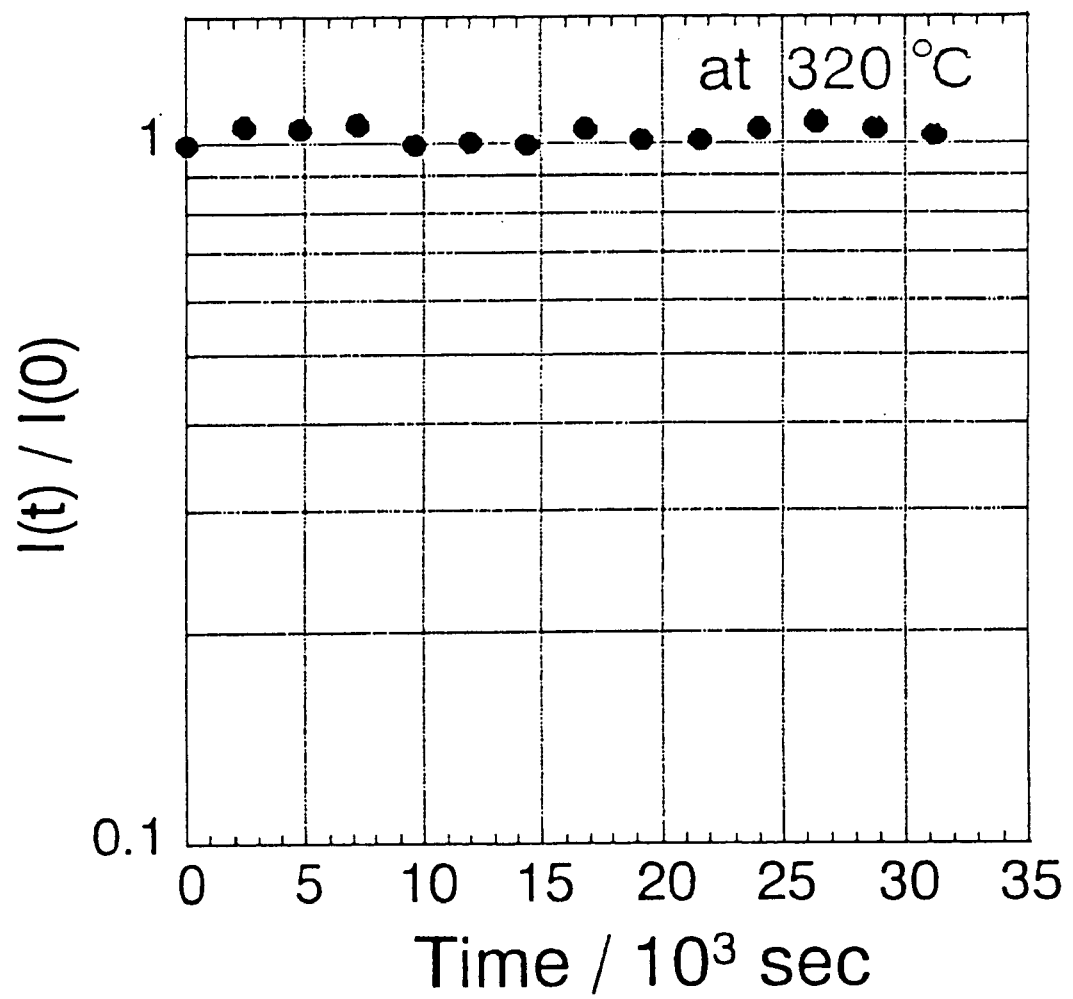
FIG. 14 is a diagram showing peak strength of X-ray diffraction.

FIG. 14 is a graph showing peak intensity in X-ray diffraction with $SO_2$ glass material subjected to UV poling and heated to 320° C. It is obvious from the drawing that no change occurs in the peak intensity even when such glass material is placed under a temperature of 320° C. for more than eight hours ($30 \times 10^3$ seconds). That is, crystals once generated through UV poling show sufficient stability with respect to temperature. It is confirmed that similar stability is presented up to a temperature of 500° C.

As described above, third-order optical non-linearity can be imparted to glass material through UV-poling. Material having third-order optical non-linearity develops second-order optical non-linearity when it is placed in an electric field. In this view, leaving polarity and so on in material can provide material having second-order optical non-linearity. That is, as long it has third-order optical non-linearity, any material, even a non glass material as described above, can develop second-order optical non-linearity through UV-excited poling.

It should be noted that studies and development for optical control devices using third-order optical non-linearity have been made, and materials having large third-order optical non-linearity have been drawing attention. The most advanced one of the studies is such that metals or semiconductor particles each having a diameter of about 1 to 10 $\mu$m are dispersed in glass to obtain a larger $X^{(3)}$ by the action of local field effect. The present invention can be understood as dispersion of such micro-particles occurring in glass material.

INDUSTRIAL APPLICABILITY

Information transmission utilizing light such as optical fibers is finding a wider use in transmitting information of a large capacity. In such information transmission systems, optical function elements are required. An optical linear material of the present invention is usable for material constituting such optical functional elements.

What is claimed is:

1. A method for manufacturing an optical non-linearity material comprising:

subjecting glass material to UV-excited poling having UV intensity 10 mJ/cm$^2$ or over and electric field intensity $3 \times 10^4$ V/cm or over to obtain micro-crystal particles made of partially crystallized glass phase, dispersing in the glass phase to form a resultant glass material, and applying subsequent UV-excited poling to the resultant glass material.

2. A method according to claim 1, further comprising annealing after applying UV-excited poling for partial crystallization, and applying IN-excited poling again after the step of annealing.

3. A method according to any one of claims 1 and 2, wherein UV-excited poling at a subsequent step is applied using a voltage lower than a voltage used in the UV-excited poling for partial crystallization.

4. A method according to claim 3, wherein the UV-excited poling for partial crystallization is applied in vacuum, and the UV-excited poling is subsequently applied in air.

* * * * *